United States Patent
Benson et al.

(10) Patent No.: US 10,196,903 B2
(45) Date of Patent: Feb. 5, 2019

(54) ROTOR BLADE COOLING CIRCUIT

(71) Applicant: General Electric Company, Schenectady, NY (US)

(72) Inventors: Adebukola Oluwaseun Benson, Simpsonville, SC (US); Xiuzhang James Zhang, Simpsonville, SC (US); Nicholas Alvin Hogberg, Greenville, SC (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 14/996,498

(22) Filed: Jan. 15, 2016

(65) Prior Publication Data
US 2017/0204730 A1    Jul. 20, 2017

(51) Int. Cl.
  *F01D 5/18*   (2006.01)
  *F02C 3/04*   (2006.01)
  *F01D 5/14*   (2006.01)
  *F01D 11/00*  (2006.01)

(52) U.S. Cl.
  CPC .......... *F01D 5/187* (2013.01); *F01D 5/143* (2013.01); *F02C 3/04* (2013.01); *F01D 11/006* (2013.01);
  (Continued)

(58) Field of Classification Search
  CPC . F01D 5/187; F01D 5/143; F01D 3/04; F01D 11/06; F02C 7/12; F02C 7/18;
  (Continued)

(56) References Cited

U.S. PATENT DOCUMENTS 6,190,130 B1 *  2/2001  Fukue .................... F01D 5/187
                                                      415/115
6,491,496 B2   12/2002  Starkweather
(Continued)

FOREIGN PATENT DOCUMENTS

EP      1 473 440 A3    9/2007
EP      3 056 674 A2    8/2016
WO      2014/186005 A2  11/2014

OTHER PUBLICATIONS

Extended European Search Report and Opinion issued in connection with corresponding EP Application No. 17151244.5 dated Jul. 11, 2017.

*Primary Examiner* — Steven Sutherland
(74) *Attorney, Agent, or Firm* — Mark E. Henderson; Ernest G. Cusick; Frank A. Landgraff

(57) ABSTRACT

The present disclosure is directed to a rotor blade for a gas turbine engine. The rotor blade includes a platform comprising a radially inner surface, an undulating radially outer surface, a leading edge portion, a trailing edge portion, a pressure-side slash face, and a suction-side slash face. An airfoil extends outwardly from the undulating radially outer surface of the platform to an airfoil tip. A connection portion extends radially inwardly from the radially inner surface of the platform. The platform, the airfoil, and the connection portion collectively define a cooling circuit extending from an inlet in the connection portion through the airfoil to a plurality of outlet plena in the platform. Two or more outlet plena of the plurality of outlet plena are spaced equidistant from the undulating radially outer surface of the platform.

14 Claims, 6 Drawing Sheets

(52) U.S. Cl.
CPC ...... *F05D 2220/32* (2013.01); *F05D 2240/24* (2013.01); *F05D 2240/81* (2013.01); *F05D 2250/185* (2013.01); *F05D 2260/201* (2013.01); *F05D 2260/205* (2013.01)

(58) Field of Classification Search
CPC ............. F05D 2220/32; F05D 2240/24; F05D 2240/81; F05D 2250/185; F05D 2260/201; F05D 2260/205
See application file for complete search history.

(56) References Cited

U.S. PATENT DOCUMENTS

| | | | |
|---|---|---|---|
| 6,722,851 B1 | 4/2004 | Brittingham et al. | |
| 6,893,210 B2 | 5/2005 | Zhang et al. | |
| 7,186,089 B2 | 3/2007 | Liang | |
| 7,270,515 B2 | 9/2007 | Liang | |
| 7,416,391 B2 | 8/2008 | Veltre et al. | |
| 7,766,606 B2 | 8/2010 | Liang | |
| 7,775,769 B1 | 8/2010 | Liang | |
| 8,231,348 B2 | 7/2012 | Torii et al. | |
| 8,641,377 B1 | 2/2014 | Liang | |
| 9,115,597 B2 | 8/2015 | Spangler et al. | |
| 9,249,674 B2 * | 2/2016 | Ellis | F01D 5/187 |
| 2004/0151587 A1 * | 8/2004 | Cunha | F01D 5/18 416/97 R |
| 2008/0107519 A1 * | 5/2008 | Ahmad | F01D 5/145 415/115 |
| 2012/0269650 A1 * | 10/2012 | Berche | F01D 5/082 416/97 R |
| 2013/0156579 A1 * | 6/2013 | Lee | F01D 5/187 416/95 |
| 2017/0122111 A1 | 5/2017 | Benson et al. | |

* cited by examiner

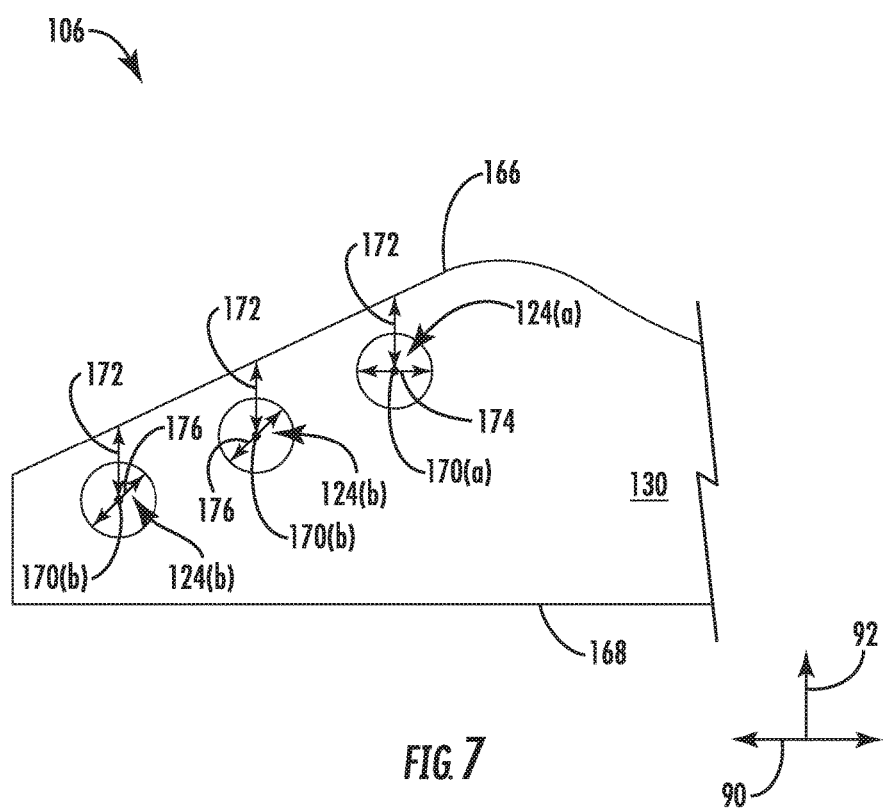

ROTOR BLADE COOLING CIRCUIT

FIELD OF THE INVENTION

The present disclosure generally relates to a rotor blade for a gas turbine. More particularly, this invention relates to a cooling circuit for a rotor blade.

BACKGROUND OF THE INVENTION

A gas turbine generally includes a compressor section, a combustion section, a turbine section, and an exhaust section. The compressor section progressively increases the pressure of a working fluid entering the gas turbine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a shaft connected, e.g., to a generator to produce electricity. The combustion gases then exit the gas turbine via the exhaust section.

The turbine section includes a plurality of turbine rotor blades, which extract kinetic energy and/or thermal energy from the combustion gases flowing therethrough. These rotor blades generally operate in extremely high temperature environments. In order to achieve adequate service life, the rotor blades typically include an internal cooling circuit. During operation of the gas turbine, a cooling medium such as compressed air is routed through the internal cooling circuit to cool the rotor blade. Nevertheless, the conventional cooling circuit arrangements may produce undesirable thermal gradients in the rotor blade or otherwise insufficiently cool the rotor blade. Accordingly, a rotor blade having a cooling circuit that does not produce undesirable thermal gradients would be useful in the art.

BRIEF DESCRIPTION OF THE INVENTION

Aspects and advantages of the invention are set forth below in the following description, or may be obvious from the description, or may be learned through practice of the invention.

In one aspect, the present disclosure is directed to a rotor blade for a gas turbine engine. The rotor blade includes a platform comprising a radially inner surface, an undulating radially outer surface, a leading edge portion, a trailing edge portion, a pressure-side slash face, and a suction-side slash face. An airfoil extends outwardly from the undulating radially outer surface of the platform to an airfoil tip. A connection portion extends radially inwardly from the radially inner surface of the platform. The platform, the airfoil, and the connection portion collectively define a cooling circuit extending from an inlet in the connection portion through the airfoil to a plurality of outlet plena in the platform. Two or more outlet plena of the plurality of outlet plena are spaced equidistant from the undulating radially outer surface of the platform.

Another aspect of the present disclosure is directed to a gas turbine that includes a compressor section, a combustion section, and a turbine section. The turbine section includes one or more rotor blades. Each of the one or more rotor blades includes a platform having a radially inner surface, an undulating radially outer surface, a leading edge portion, a trailing edge portion, a pressure-side slash face, and a suction-side slash face. An airfoil extends outwardly from the undulating radially outer surface of the platform to an airfoil tip. A connection portion extends radially inwardly from the radially inner surface of the platform. The platform, the airfoil, and the connection portion collectively define a cooling circuit extending from an inlet in the connection portion through the airfoil to a plurality of outlet plena in the platform. Two or more plena of the plurality of outlet plena are spaced equidistant from the undulating radially outer surface of the platform.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 7 is an enlarged side view of a portion of the pressure-side slash face shown in FIG. 2, illustrating the positioning of the plurality of outlet plena relative to an undulating radially outer surface thereof.

DETAILED DESCRIPTION OF THE INVENTION

Figure 1:
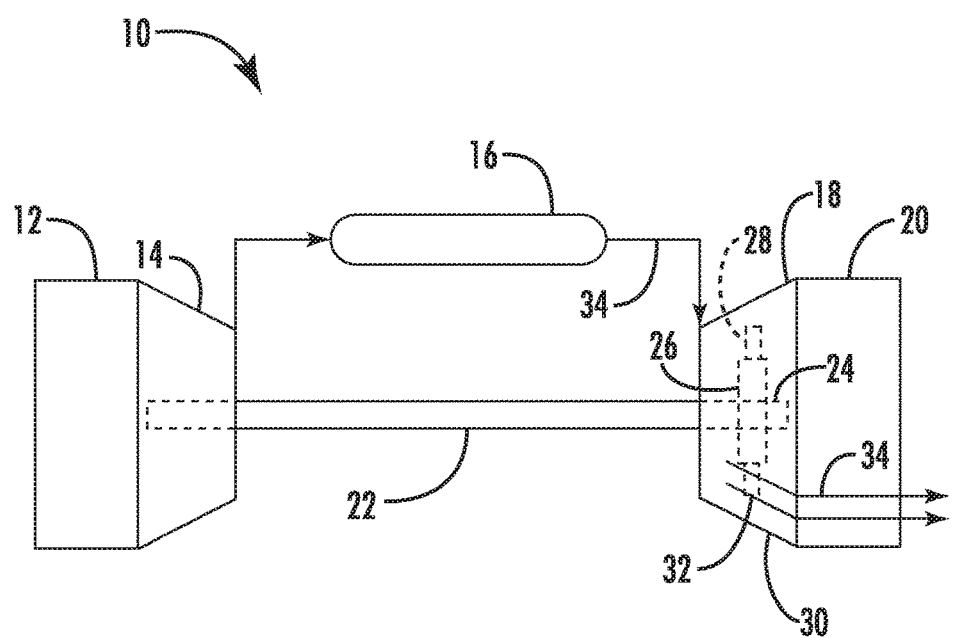
FIG. 1 is a schematic view of an exemplary gas turbine in accordance with the embodiments disclosed herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land-based gas turbine is shown and described herein, the present invention as shown and described herein is not limited to a land-based and/or industrial gas turbine unless otherwise specified in the claims. For example, the invention as described herein may be used in any type of turbine including but not limited to a steam turbine or marine gas turbine.

Now referring to the drawings, wherein identical numerals indicate the same elements throughout the figures, FIG. 1 schematically illustrates a gas turbine system 10. It should be understood that the turbine system 10 of the present disclosure need not be a gas turbine system 10, but rather may be any suitable turbine system, such as a steam turbine system or other suitable system. The gas turbine system 10 may include an inlet section 12, a compressor section 14, a combustion section 16, a turbine section 18, and an exhaust section 20. The compressor section 14 and turbine section 18 may be coupled by a shaft 22. The shaft 22 may be a single shaft or a plurality of shaft segments coupled together to form shaft 22.

The turbine section 18 may generally include a rotor shaft 24 having a plurality of rotor disks 26 (one of which is shown) and a plurality of rotor blades 28 extending radially outwardly from and interconnected to the rotor disk 26. Each rotor disk 26 in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14, where the air is progressively compressed to provide pressurized air to the combustors (not shown) in the combustion section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 28, thus causing the rotor shaft 24 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
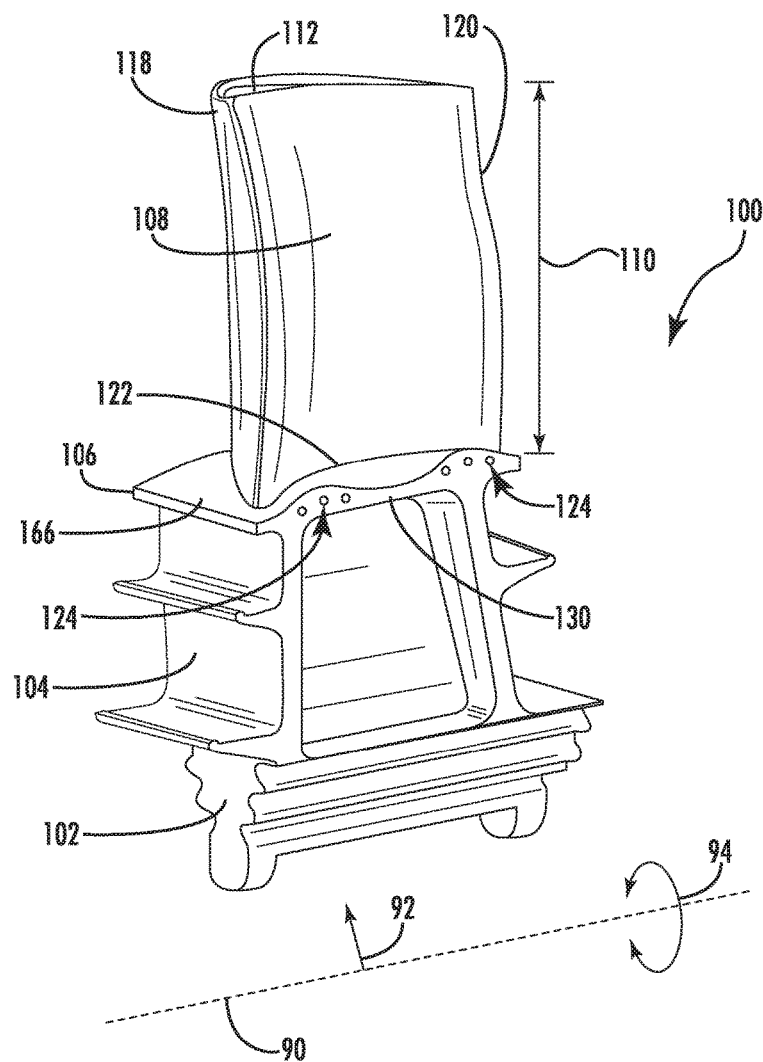
FIG. 2 is a perspective view of an exemplary rotor blade that may be incorporated in the gas turbine shown in FIG. 1, illustrating a pressure-side slash face defining a plurality of outlet plena therein.
Figure 3:
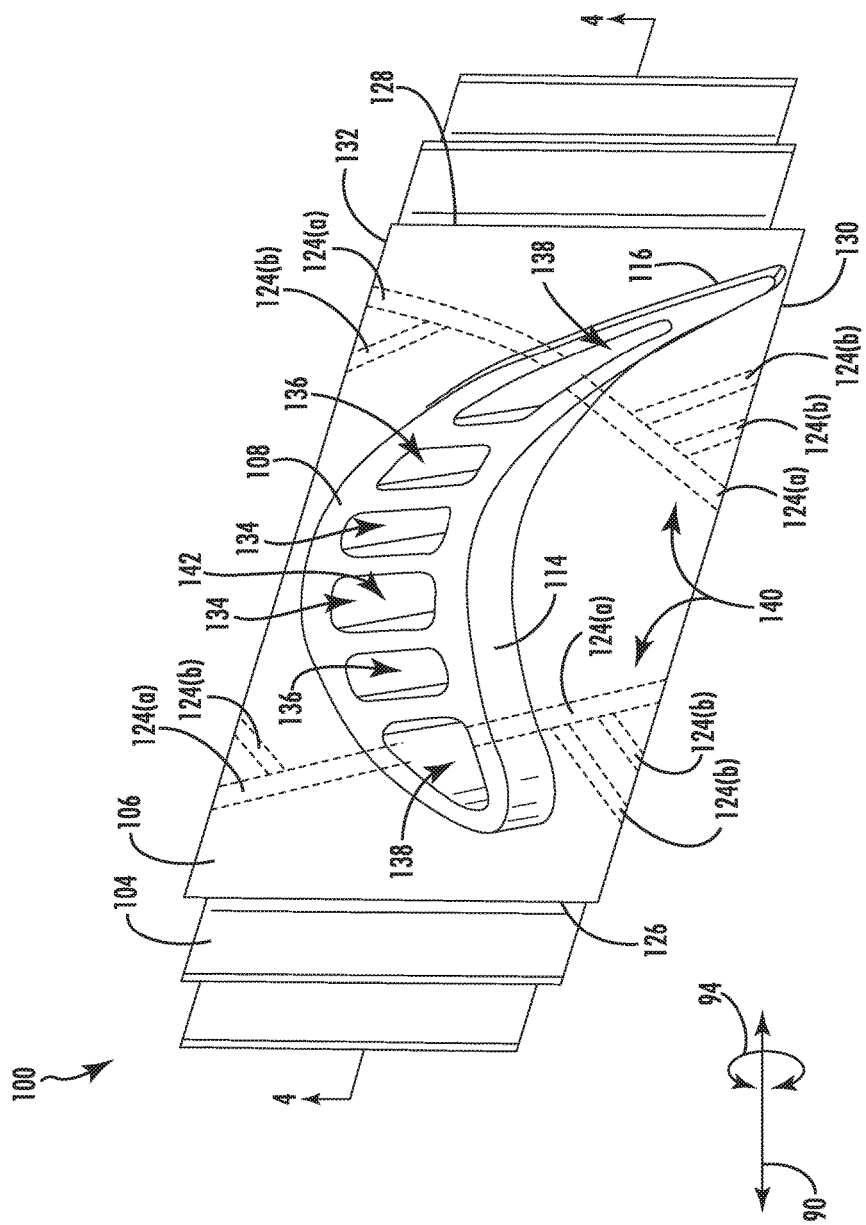
FIG. 3 is a top view of the exemplary rotor blade shown in FIG. 2, further illustrating the various features thereof.
Figure 4:
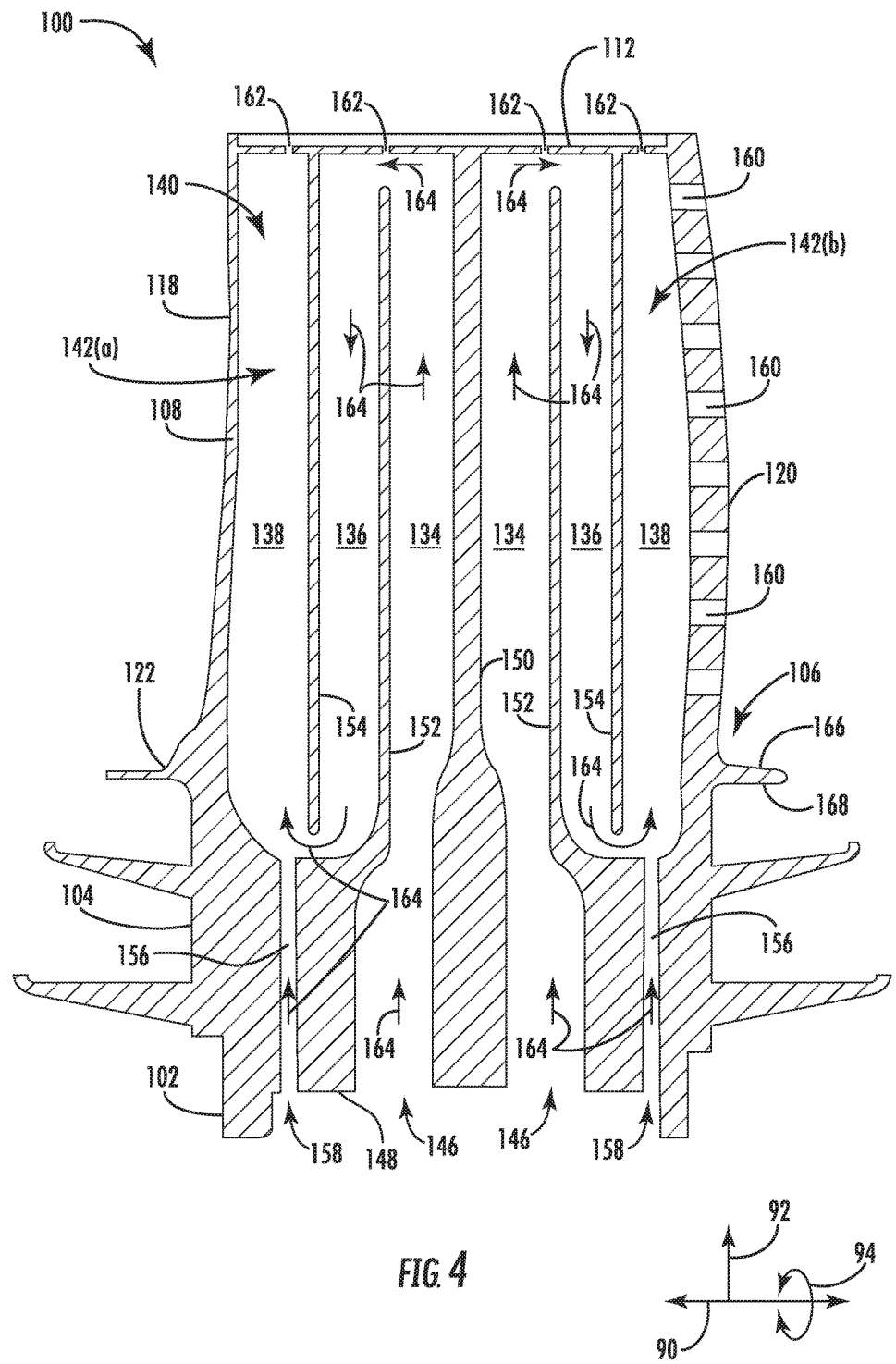
FIG. 4 is a cross-sectional view of the exemplary rotor blade shown in FIGS. 2 and 3 taken generally about line 4-4 in FIG. 3, illustrating portions of a cooling circuit.

FIGS. 2-4 are various views of an exemplary rotor blade 100, which may incorporate one or more embodiments disclosed herein and may be incorporated into the turbine section 18 of the gas turbine 10 in place of rotor blade 28 as shown in FIG. 1. As illustrated in FIGS. 2-4, the rotor blade 100 defines an axial direction 90, a radial direction 92, and a circumferential direction 94. The radial direction 92 extends generally orthogonal to the axial direction 90, and the circumferential direction 94 extends generally concentrically around the axial direction 90.

As shown in FIG. 2, the rotor blade 100 generally includes a root portion 102, which extends radially inwardly from a shank portion 104. The root portion 102 may interconnect or secure the rotor blade 100 to the rotor disk 26 (FIG. 1). In some embodiments, for example, the root portion 102 may have a dovetail configuration. The root portion 102 and the shank portion 104 may collectively be referred to as the connection portion of the rotor blade 100 in the present application.

As best illustrated in FIGS. 2-4, the rotor blade 100 includes a platform 106, which generally serves as a radially inward flow boundary for the combustion gases 34 flowing through the hot gas path 32 of the turbine section 18 (FIG. 1). More specifically, the platform 106 includes a radially inner surface 168 radially spaced apart from a radially outer surface 166. The radially inner surface 168 of the platform 106 couples to the shank 104. As such, the shank 104 extends radially inwardly from the radially inner surface 168 of the platform 106. The radially outer surface 166 of the platform 106 undulates (i.e., has a wave-like curvature). The platform 106 also includes a leading edge portion 126 axially spaced apart from a trailing edge portion 128. The leading edge portion 126 is positioned into the flow of combustion gases 34, and the trailing edge portion 128 is positioned downstream from the leading edge portion 126. Furthermore, the platform 106 includes a pressure-side slash face 130 circumferentially spaced apart from a suction-side slash face 132.

The rotor blade 100 further includes an airfoil 108 that extends radially outwardly from the platform 106 to an airfoil tip 112. As such, the airfoil tip 112 may generally define the radially outermost portion of the rotor blade 100. The airfoil 108 connects to the platform 106 at an airfoil root 122 (i.e., the intersection between the airfoil 108 and the platform 106). In this respect, the airfoil 108 defines an airfoil span 110 extending between the airfoil root 122 and the airfoil tip 112. The airfoil 100 also includes a pressure-side wall 114 and an opposing suction-side wall 116. The pressure-side wall 114 and the suction-side wall 116 are joined together or interconnected at a leading edge 118 of the airfoil 108, which is oriented into the flow of combustion gases 34. The pressure-side wall 114 and the suction-side wall 116 are also joined together or interconnected at a trailing edge 120 of the airfoil 108, which is spaced downstream from the leading edge 118. The pressure-side wall 114 and the suction-side wall 116 are continuous about the leading edge 118 and the trailing edge 120. The pressure-side wall 114 is generally concave, and the suction-side wall 116 is generally convex.

Referring to FIGS. 3 and 4, the rotor blade 100 defines a cooling circuit 140. More specifically, the cooling circuit 140 includes one or more inlet plena 146 defined by the root portion 102 and/or the shank portion 104. The one or more inlet plena 146 supply a cooling medium (e.g., compressed air bled from the compressor section 14) to one or more serpentine passages 142 defined by the airfoil 108, the platform 106, and/or the shank portion 104. The cooling medium flows from the one or more serpentine passages 142 into a plurality of outlet plena 124 that extend through the pressure-side and/or suction-side slash faces 130, 132 of the platform 106. The cooling medium exits the rotor blade 100 through the plurality of outlet plena 124 into a space defined between the rotor blade 100 and an adjacent rotor blade (not shown). In this respect, the cooling medium flows through the root portion 102, the shank portion 104, the platform 106, and the airfoil 108.

FIG. 4 illustrates one embodiment of the cooling circuit 140 that includes a first or forward serpentine passage 142(a) and a second or aft serpentine passage 142(b) axially separated from the first serpentine passage 142(a) by a first wall 150. Although, the cooling circuit 140 may include more or less serpentine passages 142 as is necessary or desired. Each of the first and the second serpentine passages 142(*a*), 142(*b*) includes a first or inner channel 134 in fluid communication with the inlet plenum 146. A second or central channel 136 fluidly couples to the first channel 134 proximate the airfoil tip 112. In this respect, a second wall 152 extending radially outwardly from the shank portion 104 separates the first and the second channels 134, 136. A third or outer channel 138 fluidly couples to the second channel 136 proximate the shank portion 104. As such, a third wall 154 extending radially inwardly from the airfoil tip 112 separates the second and the third channels 136, 138. The third channels 138 are in fluid communication with the plurality of outlet plena 124. In other embodiments, the first and the second serpentine passages 142(*a*), 142(*b*) may include more or less channels as is necessary or desired and may have other configurations as well.

The serpentine passages 142 may optionally include other features as well. For example, each of the first and/or the second serpentine passages 142(*a*), 142(*b*) may optionally include a refresher passageway 156 fluidly coupled to the third channel 138. The refresher passageway 156 receives fresh cooling medium via an inlet 158 and provides this fresh cooling medium to third channel 138. In some embodiments, the first and/or second serpentine passages 142(*a*), 142(*b*) may be in fluid communication with one or more outlet ports 162 defined in the airfoil tip 112. Furthermore, the third channel 138 of the second serpentine passage 142(*b*) may also be in fluid communication with one or more outlet ports 160 defined in the trailing edge 120 of the airfoil 108.

The cooling medium, such as cooling air 164, flows through the first and the second serpentine passages 142(*a*), 142(*b*) of the cooling circuit 140 to cool the rotor blade 100. More specifically, the cooling air 164 enters the inlet plena 164 of the first and the second serpentine passages 142(*a*), 142(*b*). The cooling flow 164 flows radially outwardly through the first channels 134 in each of the first and the second serpentine passages 142(*a*), 142(*b*). The cooling air 164 then enters the second channels 136, where the cooling air 164 flows radially inward. The cooling air 164 then flows radially outwardly in the third channels 138. The cooling air 164 may also enter the third channels 138 through the refresher passageways 156 if included. The cooling air 164 then exits the serpentine passages 142(*a*), 142(*b*) through the plurality of outlet plena 124 defined by the platform 106 and optionally through the outlet ports 160 in the trailing edge 120 and/or the outlet ports 162 in the airfoil tip 112.

Referring again to FIG. 3, the platform 106 defines plurality of outlet plena 124 in fluid communication with the one or more serpentine passages 142. More specifically, the platform 106 defines one or more primary outlet plena 124(*a*) that extend between the first or the second serpentine passages 142(*a*), 142(*b*) and the pressure-side or suction-side slash faces 130, 132. In the embodiment shown in FIG. 3, the platform 106 defines one primary outlet plenum 124(*a*) extending between the third channel 138 of the first serpentine passage 142(*a*) and the pressure-side slash face 130, one primary outlet plenum 124(*a*) extending between the third channel 138 of the first serpentine passage 142(*a*) and the suction-side slash face 132, one primary outlet plenum 124(*a*) extending between the third channel 138 of the second serpentine passage 142(*b*) and the pressure-side slash face 130, and one primary outlet plenum 124(*a*) extending between the third channel 138 of the second serpentine passage 142(*b*) and the suction-side slash face 132. In other embodiments, however, the primary outlet plena 124(*a*) may extend between any portion of the serpentine passages 142 (e.g., the first channel 134 or the second channel 136) and the pressure-side or suction-side slash faces. In some embodiments, the one or more primary cooling plena 124(*a*) may extend between the serpentine passages 142 and only one of the pressure-side or suction-side slash faces 130,132. Furthermore, more than one outlet plenum 124(*a*) may extend between a single serpentine passage 142 and one of the pressure-side or suction-side slash faces 130, 132.

As illustrated in FIG. 3, the one or more primary outlet plena 124(*a*) extend between the first and the second serpentine passages 142(*a*), 142(*b*) and the pressure-side and suction-side slash faces 130, 132 in a generally angular manner. That is, the one or more primary outlet plena 124(*a*) extend in both the axial direction 90 and the circumferential direction 94 extend between the first and the second serpentine passages 142(*a*), 142(*b*) and the pressure-side and suction-side slash faces 130, 132. Although, the primary outlet plena 124(*a*) extend between the first and the second serpentine passages 142(*a*), 142(*b*) in the circumferential direction 94 only. Furthermore, each of the primary outlet plena 124(*a*) may extend angularly toward, angularly away from, or generally perpendicular with the other outlet plena 124(*a*).

In the embodiment shown in FIG. 3, the platform 106 defines one or more secondary outlet plena 124(*b*) that extend between one of the primary outlet plena 124(*a*) and the pressure-side or suction-side slash faces 130, 132. One, two, three, or more secondary outlet plena 124(*b*) may extend between each of the primary outlet plena 124(*a*) and the pressure-side or suction-side slash faces 130, 132. Furthermore, the secondary outlet plena 124(*b*) extend between each of the primary outlet plena 124(*a*) and the pressure-side or suction-side slash faces 130, 132 on the leading edge side, trailing edge side, or both the leading and the trailing edge sides of the respective primary outlet plenum 124(*a*) from which it extends. In some embodiments, the secondary outlet plena 124(*b*) may extend from both axial sides of the primary outlet plena 124(*a*) to the pressure-side or suction-side slash faces 130, 132. Preferably, a diameter 174 (FIG. 7) of the one or more primary cooling plena 124(*a*) is longer than a diameter 176 (FIG. 7) of the one or more secondary cooling plena 124(*b*). Although, the diameter 174 of the one or more primary cooling plena 124(*a*) may be the same length as or shorter than the diameter 176 of the one or more secondary cooling plena 124(*b*). In some embodiments, secondary outlet plena 124(*b*) may extend outwardly from only some of the one or more primary outlet plena 124(*a*). Other embodiments may not include any secondary plena 124(*b*).

Figure 5:
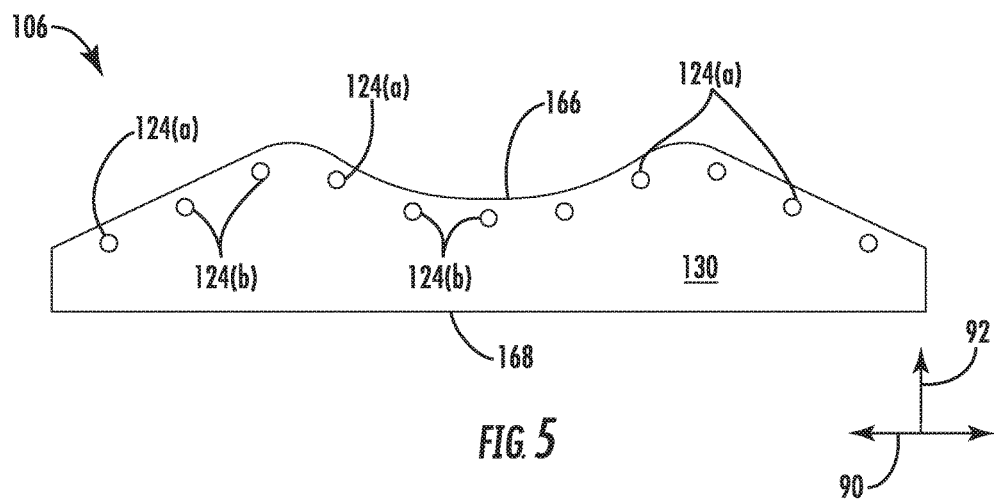
FIG. 5 is a side view of the pressure-side slash face shown in FIG. 2, illustrating a uniform arrangement of the plurality of outlet plena.
Figure 6:
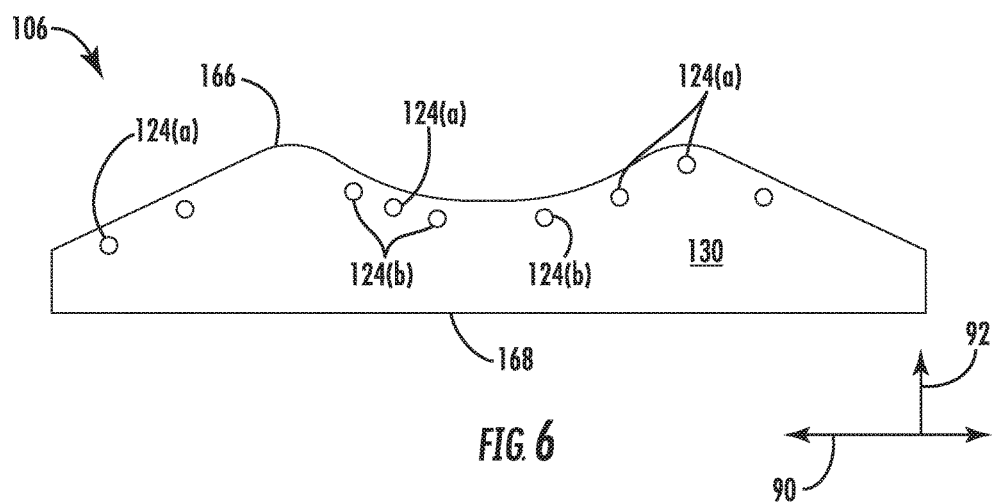
FIG. 6 is a side view of the pressure-side slash face similar to FIG. 2, illustrating a non-uniform arrangement of the plurality of outlet plena.

FIGS. 5 and 6 illustrate various arrangements of the one or more primary outlet plena 124(*a*) and the one or more secondary outlet plena 124(*b*) on the pressure-side slash face 130. The one or more primary outlet plena 124(*a*) and the one or more secondary outlet plena 124(*b*) may be arranged on the suction-side slash face 132 in a similar manner. In the embodiment illustrated in FIG. 5, each of the primary and the secondary cooling plena 124(*a*), 124(*b*) is positioned the same axial distance from the adjacent primary and the secondary cooling plena 124(*a*), 124(*b*). In this respect, each of the primary and the secondary outlet plena 124(*a*), 124(*b*) are uniformly spaced apart in the axial direction 90 or equidistantly axially spaced apart. Conversely, the primary and the secondary outlet plena 124(*a*), 124(*b*) are non-uniformly axially spaced apart in the embodiment shown in FIG. 6. In this respect, at least two adjacent primary and/or the secondary outlet plena 124(*a*), 124(*b*) are axially spaced apart a different distance than at least two other adjacent primary and/or the secondary outlet plena 124(*a*), 124(*b*). In the embodiments shown in FIGS. 5 and 6, all of the primary and the secondary outlet plena 124(*a*), 124(*b*) have the same diameter.

FIG. 7 illustrates the positioning of the plurality of outlet plena 124 (e.g., the one or primary and/or the one or more secondary outlet plena 124(*a*), 124(*b*)) on the pressure-side slash face 130 with respect to the undulating radially outer surface 166 of the platform 106. The plurality of outlet plena 124 may be positioned on the suction-side slash face 132 in a similar manner. In particular, each of the primary outlet plena 124(*a*) includes a center 170(*a*), and each of the secondary outlet plena 124(*b*) includes a center 170(*b*). As shown in FIG. 7, each of the centers 170(*a*), 170(*b*) of the respective primary and the secondary outlet plena 124(*a*), 124(*b*) are all positioned a same distance 172 (i.e., equidistant) from the undulating radially outer surface 166 of the platform 106. In the other embodiments, less than all of the primary and/or the secondary outlet plena 124(*a*), 124(*b*) may be positioned the same distance 172 (i.e., equidistant) from the undulating radially outer surface 166 so long as at least two of the primary and/or the secondary outlet plena 124(*a*), 124(*b*) are positioned the same distance 172 (i.e., equidistant) from the undulating radially outer surface 166. Positioning two or more of the primary and/or the secondary outlet plena 124(*a*), 124(*b*) the same distance 172 from the undulating radially outer surface 166 improves the cooling of the rotor blade 100 and creates more desirable thermal gradients in the platform 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A rotor blade for a gas turbine engine, comprising:
a platform comprising a radially inner surface, an undulating radially outer surface, a leading edge portion, a trailing edge portion, a pressure-side slash face, and a suction-side slash face;
an airfoil extending outwardly from the undulating radially outer surface of the platform to an airfoil tip; and
a connecting portion extending radially inwardly from the radially inner surface of the platform;
wherein the platform, the airfoil, and the connection portion collectively define a cooling circuit extending from an inlet in the connection portion through the airfoil to a plurality of outlet plena in the platform,
wherein all of the outlet plena of the plurality of outlet plena are spaced equidistant from the undulating radially outer surface of the platform; and
wherein each of the plurality of outlet plena is non-uniformly spaced apart in an axial direction along the platform.

2. The rotor blade of claim 1, wherein the plurality of outlet plena extends through the pressure-side slash face.

3. The rotor blade of claim 1, wherein the plurality of outlet plena extends through the suction-side slash face.

4. The rotor blade of claim 1, wherein each of the plurality of the outlet plena comprises a diameter, and wherein the diameter of each of the plurality of outlet plena is a same length.

5. The rotor blade of claim 1, wherein the plurality of the outlet plena comprises a first outlet plenum comprising a first diameter and a second outlet plenum comprising a second diameter, and wherein the first diameter is longer than the second diameter.

6. The rotor blade of claim 5, wherein the second outlet plenum extends angularly outwardly from the first outlet plenum.

7. The rotor blade of claim 1, wherein the cooling circuit comprises a serpentine portion positioned in the airfoil.

8. A gas turbine, comprising:
a compressor section;
a combustion section; and
a turbine section comprising:
one or more rotor blades, each of the one or more rotor blades comprising:
a platform comprising a radially inner surface, an undulating radially outer surface, a leading edge portion, a trailing edge portion, a pressure-side slash face, and a suction-side slash face;
an airfoil extending outwardly from the undulating radially outer surface of the platform to an airfoil tip; and
a connection portion extending radially inwardly from the radially inner surface of the platform;
wherein the platform, the airfoil, and the connection portion collectively define a cooling circuit extending from an inlet in the connection portion through the airfoil to a plurality of outlet plena in the platform, and
wherein all of the outlet plena of the plurality of outlet plena are spaced equidistant from the undulating radially outer surface of the platform; and
wherein the plurality of the outlet plena comprises a first outlet plenum comprising a first diameter and a second outlet plenum comprising a second diameter, and wherein the first diameter is longer than the second diameter.

9. The gas turbine of claim 8, wherein the plurality of outlet plena extends through the pressure-side slash face.

10. The gas turbine of claim 8, wherein the plurality of outlet plena extends through the suction-side slash face.

11. The gas turbine of claim 8, wherein each of the plurality of outlet plena is uniformly spaced apart in an axial direction along the platform.

12. The gas turbine of claim 8, wherein each of the plurality of outlet plena is non-uniformly spaced apart in an axial direction along the platform.

13. The gas turbine of claim 8, wherein the second outlet plenum extends angularly outwardly from the first outlet plenum.

14. The gas turbine of claim 8, wherein the cooling circuit comprises a serpentine portion positioned in the airfoil.

* * * * *